United States Patent
Petrescu et al.

(10) Patent No.: US 8,103,775 B2
(45) Date of Patent: Jan. 24, 2012

(54) SYSTEM AND METHOD FOR DISTRIBUTING A CLIENT LOAD FROM A FAILED SERVER AMONG REMAINING SERVERS IN A STORAGE AREA NETWORK (SAN)

(75) Inventors: Mihai Petrescu, Schwenksville, PA (US); Hilton S. Creve, Culver City, CA (US)

(73) Assignee: Harris Corporation, Melbourne, FL (US)

( * ) Notice: Subject to any disclaimer, the term of this patent is extended or adjusted under 35 U.S.C. 154(b) by 557 days.

(21) Appl. No.: 12/047,381

(22) Filed: Mar. 13, 2008

(65) Prior Publication Data

US 2009/0234949 A1 Sep. 17, 2009

(51) Int. Cl.
*G06F 15/173* (2006.01)

(52) U.S. Cl. ........ 709/226; 709/225; 709/250; 370/217; 370/218; 370/360; 370/400; 370/401; 718/105

(58) Field of Classification Search .................. 709/225, 709/226
See application file for complete search history.

(56) References Cited

U.S. PATENT DOCUMENTS

| | | | | |
|---|---|---|---|---|
| 5,600,573 | A | 2/1997 | Hendricks et al. | 364/514 R |
| 5,867,657 | A | 2/1999 | Bolosky et al. | 395/200.49 |
| 5,928,327 | A | 7/1999 | Wang et al. | 709/217 |
| 5,983,281 | A * | 11/1999 | Ogle et al. | 709/249 |
| 6,070,191 | A | 5/2000 | Narendran et al. | 709/226 |
| 6,389,451 | B1 * | 5/2002 | Hart | 709/201 |
| 6,427,002 | B2 * | 7/2002 | Campbell et al. | 379/88.01 |
| 6,571,349 | B1 * | 5/2003 | Mann et al. | 714/6.22 |
| 6,816,194 | B2 | 11/2004 | Zhang et al. | 348/240.27 |
| 7,062,556 | B1 * | 6/2006 | Chen et al. | 709/226 |
| 7,092,621 | B1 | 8/2006 | Yoshino et al. | 386/125 |
| 7,373,645 | B2 * | 5/2008 | Beaumont | 718/105 |
| 7,447,197 | B2 * | 11/2008 | Terrell et al. | 370/360 |
| 7,448,038 | B2 * | 11/2008 | Beaumont | 718/105 |
| 7,505,401 | B2 * | 3/2009 | Kashyap | 370/217 |
| 7,644,087 | B2 * | 1/2010 | Barkai et al. | 707/770 |
| 7,739,555 | B2 * | 6/2010 | Barsness et al. | 714/48 |
| 7,778,260 | B2 * | 8/2010 | Sturniolo et al. | 370/401 |
| 7,813,276 | B2 * | 10/2010 | Gilfix | 370/230 |
| 2002/0038339 | A1 * | 3/2002 | Xu | 709/203 |
| 2003/0028587 | A1 * | 2/2003 | Driscoll et al. | 709/203 |
| 2004/0015408 | A1 * | 1/2004 | Rauen et al. | 705/26 |
| 2004/0210724 | A1 | 10/2004 | Koning et al. | 711/153 |
| 2005/0058063 | A1 * | 3/2005 | Masuyama et al. | 370/217 |

(Continued)

FOREIGN PATENT DOCUMENTS

WO 2005/091141 9/2005

*Primary Examiner* — Backhean Tiv
(74) *Attorney, Agent, or Firm* — Allen, Dyer, Doppelt, Milbrath & Gilchrist, P.A.

(57) ABSTRACT

A system delivers data and includes a plurality of data storage devices. A plurality of servers such as video servers are connected to the plurality of data storage devices and access the data storage devices to provide streaming data to a plurality of clients upon request therefrom. Upon failure of one of the servers, the load on the remaining servers is distributed equally among remaining servers using a distribution algorithm that assigns dual client network connections to server groupings such that the failure of any one server will increase the client load on any remaining server by no more than ceil (C/P) loads, where C is the total number of configured clients that access the plurality of servers in the system and P is the total number of server pairs.

20 Claims, 5 Drawing Sheets

U.S. PATENT DOCUMENTS

| | | | |
|---|---|---|---|
| 2006/0089935 A1* | 4/2006 | Clifford et al. | 707/10 |
| 2007/0050336 A1 | 3/2007 | Bugir et al. | 707/3 |
| 2007/0050366 A1 | 3/2007 | Bugir et al. | 707/9 |
| 2007/0050382 A1 | 3/2007 | Bugir et al. | 707/100 |
| 2008/0114872 A1* | 5/2008 | Fisher et al. | 709/224 |
| 2008/0285436 A1* | 11/2008 | Robinson | 370/217 |

* cited by examiner

SYSTEM AND METHOD FOR DISTRIBUTING A CLIENT LOAD FROM A FAILED SERVER AMONG REMAINING SERVERS IN A STORAGE AREA NETWORK (SAN)

FIELD OF THE INVENTION

The present invention relates to the field of Storage Area Networks (SANs), and more particularly, the present invention relates to a system for distributing a client load from a failed server among remaining servers in a Storage Area Network used in the television broadcast industry.

BACKGROUND OF THE INVENTION

A Storage Area Network (SAN) attaches remote computer storage devices or drives such as a disk array, tape library or one or more optical storage drives to servers such that the storage devices appear as locally attached in a client-server relationship. Many Storage Area Networks use a SCSI protocol for communicating between servers and the disk drives, while employing a low-level protocol and mapping layer, for example, a Fibre Channel (FC) over an Ethernet connection.

For example, in the television broadcast industry, video servers or other data servers are often connected to fibre channel storage devices through fibre channel switches. An example of such a video system is manufactured by Harris Corporation of Melbourne, Fla. as the Nexio™ line of network video servers, switches and storage devices. The fibre channel can run on both twisted pair copper wire and fibre-optic cables with a physical connection that could be optical or non-optical. The Fibre Channel Protocol (FCP) is typically an interface protocol of SCSI on the fibre channel. The different fibre channel topologies can include point-to-point topology in which the storage devices are connected back-to-back, an arbitrated loop topology in which devices are in a loop or ring, and a switched fabric topology in which the devices or loop devices are connected to fibre channel switches, similar to an Ethernet implementation with the switches managing the state of the fabric to provide optimized connections. Usually fibre channel switches can be formed as directors that offer a high port count in a modular slot-based chassis or a smaller, fixed configuration.

Storage Area Networks that use video servers in the television broadcast industry require real time data delivery and typically support guaranteed delivery and SAN coherency in content server systems. The high data rates are typical for a streaming server, for example, 1/60th of a second, quality of service, as video frames. Small disruptions can create editing and server function problems.

Because of the high data rates required to support multiple broadcast quality video streams, the video and other server systems were traditionally built with the compressors, decompressors and signal input/output devices physically located in a computer server frame to take advantage of high speed, low latency data transfer buses. This server frame typically used a direct attached, block based storage to obtain the required data rates and a SAN for the purpose of sharing that storage with other server frames. One technique used in the television broadcast industry to achieve redundancy and reliability in this type of direct attached storage was to use off-the-shelf fibre channel technology with redundant fibre channel host ports on the server and connected to redundant fibre channel target ports on the drives. As the drive throughput and fibre channel physical layer throughput rose, larger populations of servers could be supported. Eventually, however, server populations rise to the point where further direct attachment connections are no longer possible because of limitations in the number of fibre channel log-ins permitted by the drives even though the drives are capable of delivering more data than can be used by the maximum population of content stream support components physically located in the direct attach servers.

Because of this limitation, any increase in the number of data streams required the separation of the direct storage attached server from the data stream support components using the standard client-server architecture. The full dual path redundancy of the integrated solution should be maintained because of the mission critical nature of the content or data streams within the television broadcast environment. For this reason, some systems maintained their redundant connections through dual Ethernet connections to the data or video servers while load balancing across Ethernet connections. Other server systems abandoned load balancing and configured an additional server, while others used redundant Ethernet connections from the client to the server and load balanced the Ethernet connections from the client to the server such that redundant data servers are constantly in use because of the load balancing. These systems provided adequate results, but greater enhancements to the efficiency of the Storage Area Network are desirable to allow load balanced streaming data and redundancy.

SUMMARY OF THE INVENTION

A system delivers data in accordance with a non-limiting example of the present invention and includes a plurality of data storage devices that could be data storage drives such as optical storage devices. A plurality of servers such as video servers are connected to the plurality of data storage devices and access the data storage devices to provide streaming data to a plurality of clients upon request therefrom. Upon failure of one of the servers, the load on the remaining servers is distributed equally among remaining servers using a distribution algorithm that assigns dual client network connections to server groupings such that the failure of any one server will increase the client load on any remaining server by no more than ceil (C/P) loads, where C is the total number of configured clients that access the plurality of servers in the system and P is the total number of server pairs.

The system has a maximum number of client loads in one non-limiting example on any one server as one of ceil (C/N) or ceil (C/(N−1)) in respective non-degraded and degraded network states for client loads per server where N comprises the total number of servers. In yet another aspect, an "n" number of network interfaces between each client and server exist that are scaled for hardware path redundancy. The network interface between each client and servers can use dual client network connections as physical port connections, for example, Ethernet ports between a respective client and server.

In yet another aspect, the data comprises video data used in the television broadcast industry. The plurality of storage data drives and servers form a Storage Area Network (SAN). One or more server frames can support the plurality of servers. Fibre channel switches can interconnect the plurality of servers and drives such as the optical storage drives.

A method aspect and storage area network are set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

Figure 1:
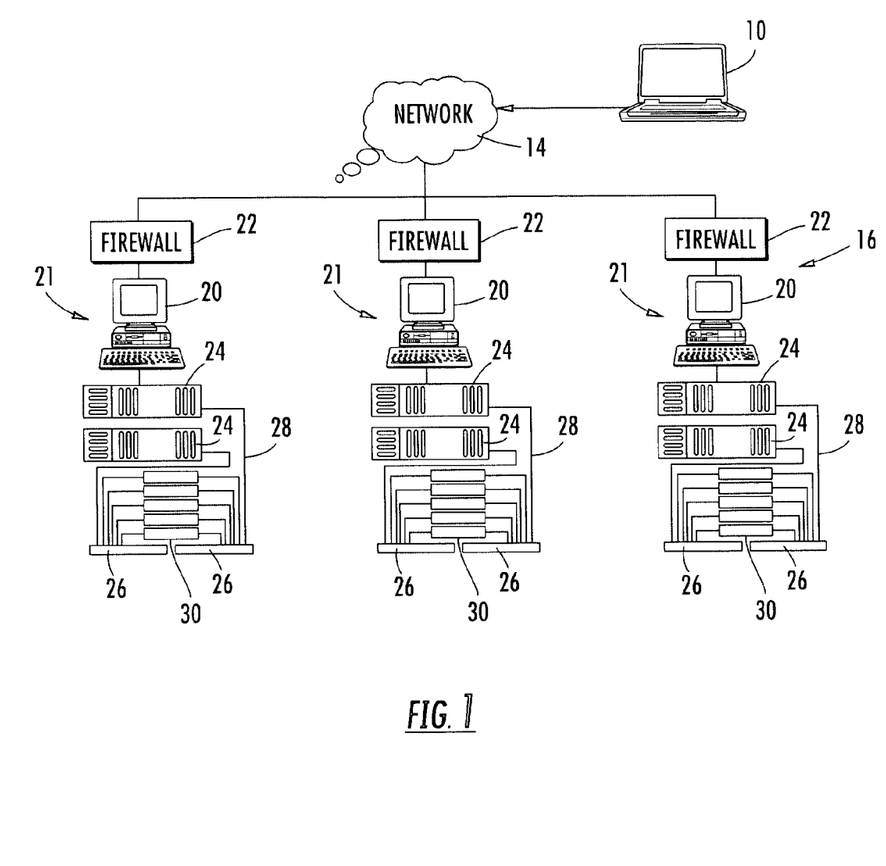
FIG. 1 is a diagram of a Storage Area Network (SAN) showing different video servers and related components that can be modified for use in accordance with non-limiting examples.

FIG. 1 is a diagram showing basic components can be modified to support multiple broadcast quality video streams that can incorporate a distance pairing distribution algorithm in accordance with a non-limiting example of the present invention for distributing loads among a plurality of clients and servers. A remote location includes a computer 10, for example, a PC, having a connection through a communications network 14 into a Storage Area Network 16. The communications network 14 could be a local area network (LAN) or wide area network (WAN). Various agents 20 are each incorporated on respective server platforms 21 and connected through firewalls 22 to the remote location computer 10. The agents 20 also connect to computer servers, for example, video or other data servers 24, such as the Nexio™ line of video servers manufactured by Harris Corporation of Melbourne, Fla. The video servers connect through fibre channel switches 26 and the fibre channel line 28 and port connections into various storage devices, for example, fibre channel storage devices 30 that are optical storage devices in this non-limiting example. Ethernet switches could be included as part of the SAN and editing workstations. The Storage Area Network 16 shown in FIG. 1 encompasses a full video storage area network used in the television broadcast industry.

It is possible to use remote server diagnostics in the Storage Area Network such as the Nexio™ Pilot system manufactured by Harris Corporation of Melbourne, Fla., to allow broadcasters to monitor the health and operational parameters of the Storage Area Network from the remote location 10 across the local area network or wide area network 14 as shown in FIG. 1. Working in conjunction with an agent 21 on a server platform 21, this type of system enables users to keep an eye on system diagnostics and make critical setting adjustments. Alert-threshold levels can be configured and activated to diagnose equipment problems before they become on-air failures. A standard Simple Network Management Protocol (SNMP) could act as an application layer protocol that facilitates exchange of management information. Different system set-up parameters and storage errors such as monitored by a software program, for example, Redundant Array of Inexpensive Disks (RAID), fibre channel issues, power supply status and other aspects of the system can also be monitored.

Different video servers can be used as a complete system to distribute high definition (HD) and standard definition (SD) content. Audio, video and metadata can be accessible with all-software codecs for coding and decoding media with different compression formats. This allows broadcasters immediate access to their media assets through the video servers and optical storage devices that can scale to thousands of hours of simultaneously accessible content. The system can withstand multiple drive failures and can support AES, MPEG layer two and compressed multi-channel audio and provide terrestrial, satellite, cable and IP distribution. The high definition and standard definition data can be mixed in one Storage Area Network.

Different video server nodes can be used, for example, the NX3600HDX or HDI, HD/SD and NX4000TXS SD transmission servers as non-limiting examples, and manufactured by Harris Corporation of Melbourne, Fla. The fibre channel fabric switches 26 can provide failover capability for the SAN 16 even with many devices per SAN. Different types of integrated storage with hot-swap storage and different baseband channels per chassis, for example, USB and other gigabyte Ethernet conductivity, including FireWire™ conductivity can be used.

The shared storage could include multiple gigabyte drives for simultaneous channels of high definition outputs (decoding) and different channel input for encoding. The user interface applications and server functions provide codec control for ingest and playout and ingest from a tape in non-limiting examples. It is also possible to use a Common Internet File System (CIFS) and different off-line and on-line workstations connected to an ingest device and Enterprise-Class Storage Area Network (XSAN).

For example, video footage could be acquired either in the field, via satellite or from a file-based delivery system and stored in the Storage Area Network where it can be accessed concurrently by newsroom executives, producers, journalists, editors and technical staff for a collaborative and shared media environment. Thus, many different people can share projects and work directly on existing and incoming files and avoid file exchange and the different requirements using the File Transfer Protocol (FTP) between systems. It is possible to edit footage stored on the Storage Area Network simultaneously. Non-limiting specifications of the video transmission server are set forth later as an example of many possible specifications for such a video server. Many different types of video servers and other data servers can be used as known to those skilled in the art.

Figure 2:
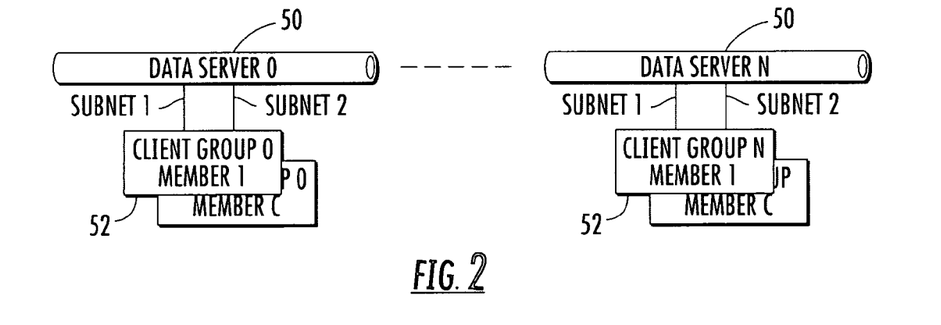
FIG. 2 is a diagram showing a single data server per client group in a Storage Area Network.

FIG. 2 is a diagram showing a number of data servers 50, for example, a video server as mentioned before, (illustrated as Data Server O through Data Server N), where clients 52 corresponding to Client Group O through Client Group N maintain redundant connections using dual Ethernet connections to the data servers and are load balanced across two Ethernet connections shown with subnet 1 and subnet 2 to the clients 52. The term data server is used generally to describe the server for streaming data, for example, video or other data. FIG. 2 shows the data server 0 and data server N each connected through the first and second subnets to respective Client Group 0 members and Client Group N members. This configuration has several advantages, including redundant Ethernet connections from the client 52 to the server 50, load balanced Ethernet connections from the client 52 to the server 50, and a low server population. One of the disadvantages of such an architecture shown in FIG. 2 is the non-redundant data server. With the architecture shown in FIG. 2, the failure of a data server 50 will result in the failure of all the attached clients 52 because both Ethernet links will fail simultaneously.

Figure 3:
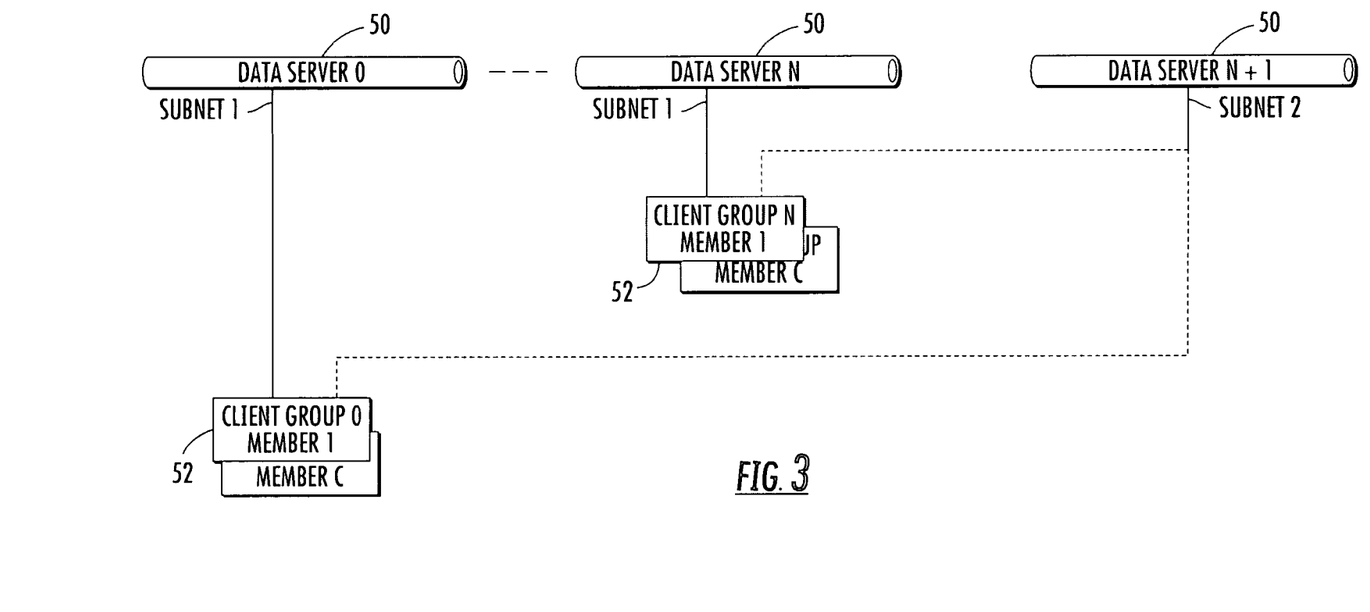
FIG. 3 is another diagram similar to FIG. 2, and showing a spare server alternative in a Storage Area Network.

This can be avoided by abandoning load balancing and configuring one additional server such as shown in FIG. 3, with a data server N+1, such that this server becomes the back-up connection for every client in the system. FIG. 3 shows the additional data server N+1. Load balancing is not used in this configuration shown in FIG. 3 because the load of all the client groups would overwhelm the redundant server N+1. In this configuration, the primary servers (servers 1 through N) handle 100% of the client load and the back-up server N+1 handles no load unless a primary server in the 1 through N group fails. This has several advantages, including redundant Ethernet connections from the client 52 to the server 50, a redundant data server (N+1) and a trivial increase in any required server population. The configuration shown in FIG. 3 may have some drawbacks, primarily no load balanced Ethernet connections from the client 52 to the server 50. For example, the redundant server N+1 can silently fail and require scheduled manual testing to verify its performance.

Figure 4:
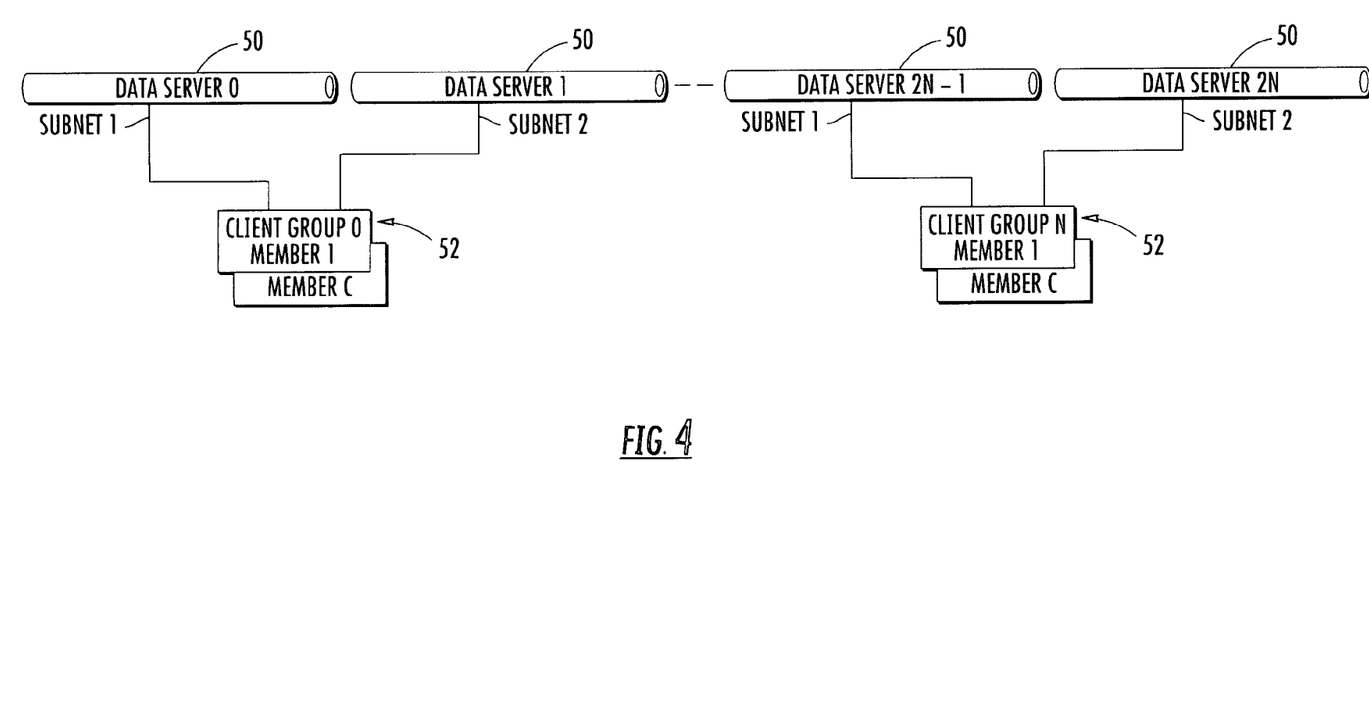
FIG. 4 is another diagram similar to FIG. 2, and showing a spare alternative with redundant connections from client to server in a Storage Area Network.

The possible drawbacks of the architecture shown in FIG. 3 can be avoided by connecting each client group to two servers, each of which is capable of supporting the full load of all clients as shown in FIG. 4 with data servers 0 and 1 connected to client group 0 and data servers 2N−1 and 2N connected to client group N. When the system is functioning in a non-degraded state, each server is loaded only to 50% of its potential load. The advantages of that client-server architecture shown in FIG. 3 is a redundant Ethernet connection from the client to the server, load balanced Ethernet connections from the client to the server and redundant data servers that are constantly in use because of load balancing, which cannot silently fail without notice. A possible disadvantage is that the server population must be doubled, which can increase the cost and complexity of the entire Storage Area Network.

There now follows a description of the distribution algorithm in accordance with non-limiting examples of the present invention. The distribution algorithm provides network service redundancy in real time data delivery environments, automatic set-up of redundant service connections, no idle servers for redundancy and minimal additional loading on remaining servers during a failure event.

Throughout this description, different terms will be used as general terms. For example, the term data server could correspond to a computer server that provides streaming data services on at least one physical Ethernet interface, for example, as noted before, streaming video data from the server, also termed video server. The term client could correspond to a computer that attaches via a physical interface such as a network interface card using common Ethernet protocols to at least one and preferably more than one data server to send or receive streaming data. For example, the client could be a news editor that receives the video data for editing. The term client load could correspond to the load on each server from a particular client as 0.5* (# of active Ethernet connections to that server). A NIC (Network Interface Card) could correspond to one physical port used to send and receive data over the network, for example, an Ethernet port. Throughout this description, server and data server may be used interchangeably. The Network Interface Card (NIC) can also be referred to as a network card, network adapter, or LAN adapter, for example, the hardware that allows computers to communicate over the computer network. This device is typically an OSI layer 1, physical layer device and layer 2 device and provides low-level addressing. It is typically used as an Ethernet card and it includes a unique 48-bit serial number as the Media Access Control (MAC) address, typically stored in ROM carried on the card. The device can be used for different types of communications, including polling, program input and output, interrupt-driven input and output, and DMA.

In accordance with non-limiting examples, the clients are grouped such that a failure of any one server increases the load on other servers equally and by a minimal amount, thus eliminating the disadvantages of the common architectures shown in FIGS. 2-4. A distribution algorithm is used to assign the two client network connections to assorted server groupings, such that the failure of any one server will increase the client load on any remaining server by no more than the ceil (C/P) loads, where C is the total number of configured clients in the system and P is the total number of server pairs. The servers may contain one or more physical network interfaces. In one non-limiting example, a distance pairing distribution algorithm is used as explained below.

The distribution algorithm uses distance pairing distribution equations and has several defining equations.

Inputs: a) N=the number of data servers; and b) c=a particular client number, 0-based.

Outputs: s0, s1=data servers assigned to the client c, 0-based.

Algorithm:

a) $P=N*(N-1)$ as the number of server pairs;

b) $k=c \bmod P$ as a server pair to use, 0-based with the pairs enumerated in a distance order;

c) $d=INT(k/N)+1$ as the distance between the pair's servers;

d) $s0=k \bmod N$ as the first server assigned to the client; and e) $s1=(s0+d) \bmod N$ as the second server assigned to the client.

Figure 5:
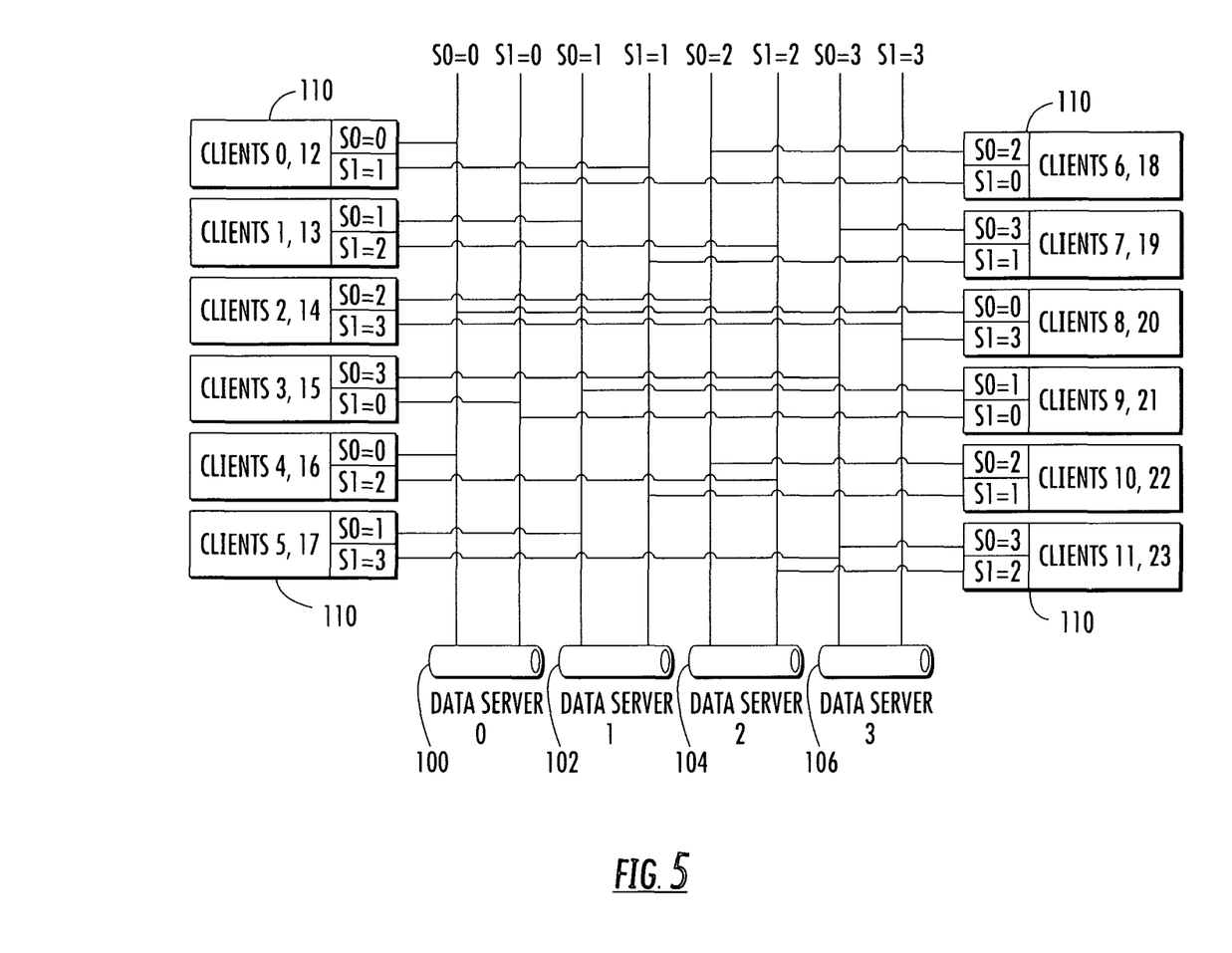
FIG. 5 is a diagram of the data connections for clients and servers in a Storage Area Network in accordance with a non-limiting example of the present invention.

FIG. 5 shows an example of the client and server assignments using the distance pairing distribution equations in a non-limiting aspect. For example, a) the number of data servers=4; and b) the number of data server pairs (P)=12; and c) the number of configured clients=24. This is shown in the data connection representation where the four servers are illustrated at 100, 102, 104 and 106 and their connections are shown to various clients 110, which are numbered, as well as assigned servers, as the first server S0 and second server S1. Table 1 is a tabular representation as a non-limiting example.

TABLE 1

| Client number | k (pair) | d (distance) | s0 (First Server) | s1 (Second Server) |
|---|---|---|---|---|
| 0 | 0 | 1 | 0 | 1 |
| 1 | 1 | 1 | 1 | 2 |
| 2 | 2 | 1 | 2 | 3 |
| 3 | 3 | 1 | 3 | 0 |
| 4 | 4 | 2 | 0 | 2 |
| 5 | 5 | 2 | 1 | 3 |
| 6 | 6 | 2 | 2 | 0 |
| 7 | 7 | 2 | 3 | 1 |
| 8 | 8 | 3 | 0 | 3 |
| 9 | 9 | 3 | 1 | 0 |
| 10 | 10 | 3 | 2 | 1 |
| 11 | 11 | 3 | 3 | 2 |
| 12 | 0 | 1 | 0 | 1 |
| 13 | 1 | 1 | 1 | 2 |
| 14 | 2 | 1 | 2 | 3 |
| 15 | 3 | 1 | 3 | 0 |

TABLE 1-continued

| Client number | k (pair) | d (distance) | s0 (First Server) | s1 (Second Server) |
|---|---|---|---|---|
| 16 | 4 | 2 | 0 | 2 |
| 17 | 5 | 2 | 1 | 3 |
| 18 | 6 | 2 | 2 | 0 |
| 19 | 7 | 2 | 3 | 1 |
| 20 | 8 | 3 | 0 | 3 |
| 21 | 9 | 3 | 1 | 0 |
| 22 | 10 | 3 | 2 | 1 |
| 23 | 11 | 3 | 3 | 2 |

The system calculates the maximum number of client loads per data server in the distance pairing distribution algorithm. For example, given that C is the total number of clients and N is the total number of data servers, then the following equations calculate the maximum client load on any one server in both modes of operation. In a non-degraded state, the client loads per server<=ceil (C/N). In a degraded state, the client loads per server<=ceil(C/(N−1)). An example concerns client loads per data server in non-degraded operation using the distance pairing distribution equations. In the example in Table 1, there are clients presenting loads to each server. All clients listed present a 0.5 load to each server:

```
Server 0 - Clients 0, 3, 4, 6, 8, 9, 12, 15, 16, 18, 20, 21;
TOTAL Client load = 6
Server 1 - Clients 0, 1, 5, 7, 9, 10, 12, 13, 17, 19, 21, 22;
TOTAL Client load = 6
Server 2 - Clients 1, 2, 4, 6, 10, 11, 13, 14, 16, 18, 22, 23;
TOTAL Client load = 6
Server 3 - Clients 2, 3, 5, 7, 8, 11, 14, 15, 17, 19, 20, 23;
TOTAL Client load = 6
```

The client loads per data server in a degraded operation can also use the distance pairing distribution equations. In the example of Table 1, clients present loads to each server where server 0 has failed. All clients listed present 0.5 load to each server. Clients that have lost a connection to Server 0 now appear twice in the other server lists.

```
Server 0 - FAILED
Server 1 - Clients 0, 0, 1, 5, 7, 9, 9, 10, 12, 12, 13, 17, 19, 21,
21, 22; TOTAL Client load = 8
Server 2 - Clients 1, 2, 4, 4, 6, 6, 10, 11, 13, 14, 16, 16, 18, 18,
22, 23; TOTAL Client load = 8
Server 3 - Clients 2, 3, 3, 5, 7, 8, 8, 11, 14, 15, 15, 17, 19, 20,
20, 23; TOTAL Client load = 8
```

Figure 6:
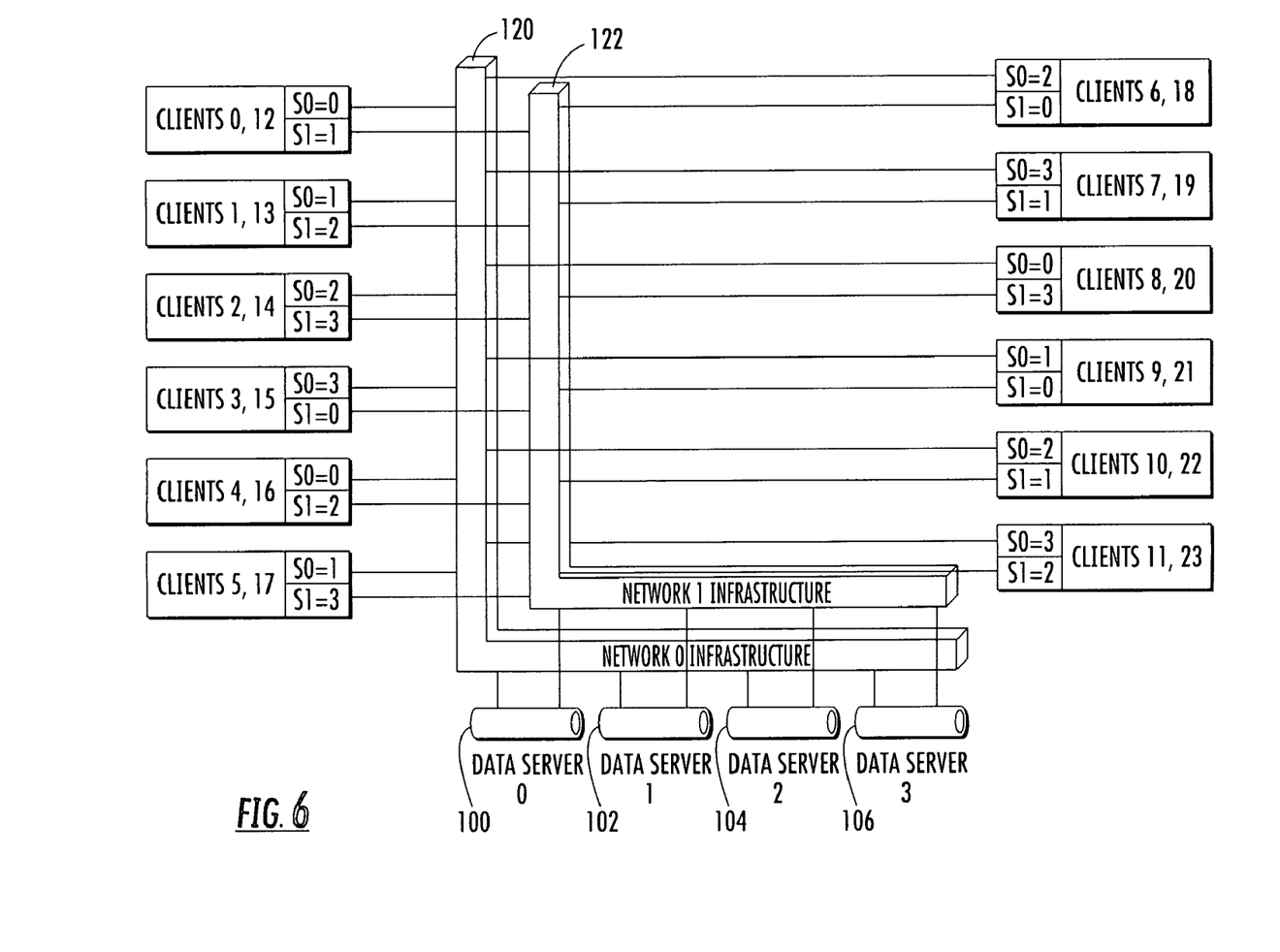
FIG. 6 is another diagram showing an external network structure for clients and servers in a Storage Area Network in accordance with a non-limiting example of the present invention.

FIG. 5 shows the possible client server connections in the system defined in the above example, and FIG. 6 is similar example, while also showing the two network infrastructures 120, 122 for the NICs.

A number of NICs are typically required to implement distance pairing distribution equations. The minimum number of NICs is one on each client and one on each data server. The number of NICs on each device may be freely scaled as desired without regard to the number of NICs on any other device. This makes the system flexible to achieve the desired amount of hardware path redundancy at each location, or to increase the data throughput. In the example shown in FIGS. 4 and 5, two NICs are implied, but not necessary. If one NIC is used in any or all locations, then the external network infrastructure should be capable of routing the data supporting both the s0 and s1 connections to a single NIC on the device.

It is possible to design systems containing more than two network interfaces on the servers. FIG. 6 visually describes the data connection of a system containing two NICs on both clients and servers. In this special case, the loading on all NICs is balanced by making the data connection between clients and the server dependent on where the server appears in Table 1. If the server appears in the s0 column for a particular client, then NIC 0 for the first network infrastructure 120 is used for the connection on both client and server. If the server appears in the s1 column for a particular client, then NIC 1 for the second network infrastructure 122 is used for the connection on both client and server.

If more than two NICs are used on the servers, then the distribution algorithm distributes the client data connections among the server NICs. The following steps could be followed in a non-limiting example.

1. Assign all clients to the servers per the distance pairing distribution algorithm such as shown in the example of Table 1.

2. For every server[i] create two sets of clients: server0[i]={client[k] where client[k]·s0=i} and server1[i]={client[k] where client[k]·s1=i}.

3. Sort the server0[i] list by the s1 key, and sort the server1[i] list by the s0 key, with a secondary sort by the client number.

4. Concatenate the Server0[i] lists and the Server1[i] lists.

5. Assign circularly the network 0's NICs to server0[i] and the network 1's NICs to server1[i]. An example follows for 6 NICs per Data Server.

Further details are explained below.

STEP 1: refer to Table 1.

STEPS 2 & 3: See lists below. The primary sort key is in parentheses.

```
Server0[0]:    0(1), 12(1), 4(2), 16(2), 8(3), 20(3)
Server1[0]:    9(1), 21(1), 6(2), 18(2), 3(3), 15(3)
Server0[1]:    9(0), 21(0), 1(2), 13(2), 5(3), 17(3)
Server1[1]:    0(0), 12(0), 10(2), 22(2), 7(3), 19(3)
Server0[2]:    6(0), 18(0), 10(1), 22(1), 2(3), 14(3)
Server1[2]:    4(0), 16(0), 1(1), 13(1), 11(3), 23(3)
Server0[3]:    3(0), 15(0), 7(1), 19(1), 11(2), 23(2)
Server1[3]:    8(0), 20(0), 5(1), 17(1), 2(2), 14(2)
```

STEP 4: Concatenate the server 0[i] and server 1[i] lists.

```
Server0

0(1), 12(1), 4(2), 16(2), 8(3), 20(3), 9(0), 21(0), 1(2),
13(2), 5(3), 17(3), 6(0), 18(0), 10(1), 22(1), 2(3), 14(3),
3(0), 15(0), 7(1), 19(1), 11(2), 23(2)

Server1

9(1), 21(1), 6(2), 18(2), 3(3), 15(3), 0(0), 12(0), 10(2),
22(2), 7(3), 19(3), 4(0), 16(0), 1(1), 13(1), 11(3), 23(3),
8(0), 20(0), 5(1), 17(1), 2(2), 14(2)
```

STEP 5: Circular assignment of 3 NICs to s0 connection and 3 NICs to s1 connection:

```
s0 Nic 0:    0, 16, 9, 13, 6, 22, 3, 19
s0 Nic 1:    12, 8, 21, 5, 18, 2, 15, 11
s0 Nic 2:    4, 20, 1, 17, 10, 14, 7, 23
s1 Nic 3:    9, 18, 0, 22, 4, 13, 8, 17
s1 Nic 4:    21, 3, 12, 7, 16, 11, 20, 2
s1 Nic 5:    6, 15, 10, 19, 1, 23, 5, 14
```

Sorting for Clarity:

| | |
|---|---|
| s0 Nic 0: | 0, 3, 6, 9, 13, 16, 19, 22 |
| s0 Nic 1: | 2, 5, 8, 11, 12, 15, 18, 21 |
| s0 Nic 2: | 1, 4, 7, 10, 14, 17, 20, 23 |
| s1 Nic 3: | 0, 4, 8, 9, 13, 17, 18, 22 |
| s1 Nic 4: | 2, 3, 7, 11, 12, 16, 20, 21 |
| s1 Nic 5: | 1, 5, 6, 10, 14, 15, 19, 23 |

Table 2 is an example showing the server/NIC connections using the distance pairing distribution algorithm for the NICs. S0 corresponds to the first server and the S1 to the second server. The NIC for the first server corresponds to S0 NIC and for the second server corresponds to S1 NIC. Table 3 shows the client connections per NIC or each server in a non-degraded mode, corresponding to the four servers listed as servers 0-3 with server 0 as the first server.

TABLE 2

Server/NIC Connections Using Distance Pairing with NIC Distribution Algorithm

| Client number | s0 | s1 | s0 NIC | s1 NIC |
|---|---|---|---|---|
| 0 | 0 | 1 | 0 | 3 |
| 1 | 1 | 2 | 2 | 5 |
| 2 | 2 | 3 | 1 | 4 |
| 3 | 3 | 0 | 0 | 4 |
| 4 | 0 | 2 | 2 | 3 |
| 5 | 1 | 3 | 1 | 5 |
| 6 | 2 | 0 | 0 | 5 |
| 7 | 3 | 1 | 2 | 4 |
| 8 | 0 | 3 | 1 | 3 |
| 9 | 1 | 0 | 0 | 3 |
| 10 | 2 | 1 | 2 | 5 |
| 11 | 3 | 2 | 1 | 4 |
| 12 | 0 | 1 | 1 | 4 |
| 13 | 1 | 2 | 0 | 3 |
| 14 | 2 | 3 | 2 | 5 |
| 15 | 3 | 0 | 1 | 5 |
| 16 | 0 | 2 | 0 | 4 |
| 17 | 1 | 3 | 2 | 3 |
| 18 | 2 | 0 | 1 | 3 |
| 19 | 3 | 1 | 0 | 5 |
| 20 | 0 | 3 | 2 | 4 |
| 21 | 1 | 0 | 1 | 4 |
| 22 | 2 | 1 | 0 | 3 |
| 23 | 3 | 2 | 2 | 5 |

TABLE 3

Table of Client Connections per NIC on Each Server (Non-Degraded Mode)

| NIC | server 0 | server 1 | server 2 | server 3 |
|---|---|---|---|---|
| 0 | 2 | 2 | 2 | 2 |
| 1 | 2 | 2 | 2 | 2 |
| 2 | 2 | 2 | 2 | 2 |
| 3 | 2 | 2 | 2 | 2 |
| 4 | 2 | 2 | 2 | 2 |
| 5 | 2 | 2 | 2 | 2 |

There are failover bounds when using the NIC distribution algorithm.

1. clients_per_NIC<=ceil (clients_per_server/number_of_NICs)
2. failed_over_clients_per_NIC<=ceil (failed_over_clients_per_server/number_of_NICs)

The system and method as described implements redundant load balanced streaming data with minimal addition of server hardware and distributes a client load from a failed server typically somewhat equally among the remaining servers. It uses the distance pairing distribution algorithm as described for load balancing and redundancy that uses all configured servers, typically eliminating the possibility of an unnoticed failure or degradation of a hot spare server, while also eliminating the requirement for scheduled testing of the server. It can increase throughput by adding network interfaces to data servers and distribute client loads evenly across network interfaces and guarantee a maximum additional load that can be imposed on any remaining data server when another data server fails.

Different specifications of a streaming transmission server such as a Nexio™ server that can be used in accordance with a non-limiting example include the following specifications only for purposes of description:

| SYSTEM CONFIGURATION | |
|---|---|
| Main Frame | 2 Dual Core AMD ™ Opteron 64-bit Processors |
| | PCI-X Platform |
| | 4 GB System Memory |
| | Dual Mirrored SATA Boot Drives |
| | Dual Channel 4 Gbps Fiber Channel Host Bus Adapter |
| | 2x 10/100/1000BaseT Ethernet Adapter |
| | PS/2 Keyboard & Mouse |
| | 3x USB 2.0 port - 1 port mounted on the front |
| | 1x IEEE1394 (FireWire) port - mounted on the front |
| | Windows XP Professional |
| | NXOS - NEXIO Operating System |
| VIDEO | |
| Channels | 525/625: 2 bi-directional and 2 play only mode or 2 in and 4 out discrete mode |
| | HD: 1 bi-directional and 1 play only mode or 1 in and 2 out discrete mode |
| | 525/625: SDI serial digital interface (SMPTE-259M) |
| | HD: HD-SDI interface (SMPTE-292M) |
| Formats | 525 @ 29.97 fps, 625 @ 25 fps, 1080i @ 29.97 fps and 25 fps, 720 p @ 59.94 fps and 50 fps |
| Inputs | 525/625: 2 x Program - SDI BNC (SMPTE-259M) |
| | HD: 1x Program - HD-SDI (SMPTE-292M) |
| | 1 x Genlock reference - tri-level and bi-level sync support |
| Outputs | 525/625: 4x SDI BNC (SMPTE-259M) |
| | HD: 2x HD-SDI BNC (SMPTE-292M) |
| Aspect Ratio | 525/625: 16:9 and 4:3 |
| | HD: 16:9 |
| AUDIO | |
| Channels & Formats | Two AES/EBU pairs per input channel |
| | Two AES/EBU pairs per output channel |
| | 8 channels embedded per input channel |
| | 8 channels embedded per output channel |
| Inputs | 2 Pair BNC, unbalanced (AES/EBU) per channel BNC (embedded) |
| Outputs | 2 Pair BNC, unbalanced (AES/EBU) per channel BNC (embedded) |
| Processing & Storage | 16, 20, or 24-bit PCM, 48 kHz |
| Compressed Audio | Dolby Digital (AC-3) and Dolby E pass-through |
| VIDEO COMPRESSION | |
| Coding | 525/625: MPEG2 I-frame, 4:2:2 profile - 12 to 50 Mbps, MPEG2 Long GOP, 4:2:0 profile - 4 to 15 Mbps , 4:2:2 profile - 10 to 50 Mbps, DVCPRO25, DVCPRO50 and DVCAM |

-continued

| | |
|---|---|
| Decoding | 1080i/720p - MPEG 2 I-frame, 4:2:2 profile - 50, 80, 100, 120, and 150, MPEG2 Long GOP, 4:2:2 profile - 50 Mbps, MPEG2 Long GOP, 4:2:0 profile - 50 Mbps<br>525/625 - MPEG2 I-frame up to 50 Mbps, MPEG2 Long GOP, 4:2:2 profile - 10 to 50 Mbps, 4:2:0 profile - 4 to 15 Mbps, DVCPRO25, DVCPRO50, DVCAM, IMX 30, 40 & 50 Mbps<br>1080i/720p - MPEG 2 Long GOP up to 80 Mbps and MPEG 2 I-frame at 4:2:2 profile up to 150 Mbps |
| VIDEO STORAGE | |
| Storage options | Choice of 5x 146 GB or 5x 300 GB drives |
| RAID REDUNDANCY | |
| Controller | Software RAID |
| RAID Protection Schemes | Single drive parity (RAID-3 single failure protection) |
| TIMECODE CONNECTION OPTIONS | |
| Input/Output | RS-232<br>TCP-IP<br>Harris clock interface |
| REMOTE GPI CONTROL | |
| Inputs | 16 inputs |
| Outputs | 8 outputs |
| REMOTE SERIAL INTERFACE | |
| Input/Output | 4x RS-422 ports<br>DB-9 connector |
| CONTROL | |
| Input/Output | TCP/IP socket or UDP over Ethernet<br>RS-422<br>GPI |
| Protocols | Harris Native Protocol<br>VDCP<br>Sony 9 Pin |
| PHYSICAL CHARACTERISTICS | |
| Dimensions | Height 5.25" (13.4 cm) (3RU)<br>Width 19" (48.3 cm)<br>Depth 27.75" (70.7 cm) |
| Weight | 65 lbs (29.5 kg) |
| Power Supply | Redundant dual load-sharing<br>AC 115 to 120/200 to 240 V, auto select<br>60/50 Hz<br>690 W |

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for delivering data, comprising: a plurality of data storage devices that store data; and a plurality of servers connected to said plurality of data storage devices that access the data storage devices to provide streaming data to a plurality of clients configured in client groups upon request therefrom, and further comprising a network interface connecting each client group and two servers as a server pair forming a server group using dual client network connections, wherein each connected server pair is operable to support the full load of all client groups, wherein said clients are grouped such that failure of any one server increases the load on other servers equally, wherein a distribution algorithm assigns the dual client network connections to assorted server groupings such that the failure on any one server will increase a client load on any remaining server by no more than ceil (C/P) loads, where C is a total number of configured clients that access the plurality of servers in the system and P is a total number server pairs; wherein a maximum number of client loads on any one server comprises one of ceil (C/N) or ceil (C/(N−1)) in respective non-degraded and degraded network states for client loads per server where N comprises the total number of servers.

2. The system according to claim 1, and further comprising an "n" number of network interfaces between each client and server that is scaled for hardware path redundancy.

3. The system according to claim 1, wherein said dual client network connections comprise physical port connections.

4. The system according to claim 3, wherein said physical port connections comprise Ethernet ports between a respective client and server.

5. The system according to claim 1, wherein said data comprises video data used in a television broadcast industry.

6. The system according to claim 1, wherein said plurality of servers and plurality of data storage devices comprises a Storage Area Network.

7. The system according to claim 1, and further comprising one or more server frames that support said plurality of servers.

8. The system according to claim 1, wherein said plurality of data storage devices comprises optical storage drives interconnected using fibre channel connections.

9. The system according to claim 8, and further comprising fibre channel switches interconnecting said plurality of servers and optical storage drives.

10. A storage area network for providing streaming video data to clients that are configured in client groups during a television broadcast, comprising: a plurality of optical storage drives that store video data and interconnected using fibre channel connections; at least one fibre channel switch connected to said optical storage drives; and a plurality of video servers each having at least one network interface card (NIC) connected to a client group, wherein said plurality of video servers are configured as a video server pair forming a server group and connected to a client group and said at least one optical fibre switch for accessing the optical storage drives to provide streaming video data to the client groups through a NIC upon request therefrom, wherein each connected video server pair is operable to support the full load of all client groups, wherein said clients are grouped such that failure of any one server increases the load on other servers equally, wherein a distribution algorithm assigns dual client network connections to assorted video servers such that the failure on any one video server will increase a client load on any remaining video server by no more than ceil (C/P) loads, where C is a total number of configured clients that access the plurality of video servers and P is the total number video server pairs and NIC's are assigned circularly through the network; wherein a maximum number of client loads on any one video server comprises one of ceil (C/N) or ceil (C/(N−1)) in respective non-degraded and degraded network states for client loads per server where N comprises the total number of video servers.

11. The storage area network according to claim 10, and further comprising an "n" number of network interfaces between each client and video server that is scaled for hardware path redundancy.

12. The storage area network according to claim 10, wherein said NIC's communicate using an Ethernet protocol.

13. The storage area network according to claim 10, and further comprising one or more server frames that support said plurality of video servers.

14. A method for delivering data, comprising: storing data within a plurality of data storage devices; accessing the data using a plurality of servers connected to the data storage devices to provide streaming data to clients that are configured in client groups upon request therefrom, further comprising a network interface connecting each client group and two servers as a server pair forming a server group using dual network connections; and wherein each connected server pair is operable to support the full load of all client groups, wherein said clients are grouped such that failure of any one server increases the load on other servers equally, wherein a distribution algorithm assigns the dual client network connections to assorted server groupings such that the failure on any one server will increase a client load on any remaining server by no more than ceil (C/P) loads, where C is the total number of configured clients that access the plurality of servers and P is the total number server pairs; distributing the load among a maximum number of client loads on any one server by one of ceil (C/N) or ceil (C/(N−1)) in respective non-degraded and degraded network states for client loads per server where N comprises the total number of servers.

15. The method according to claim 14, which further comprises scaling for hardware path redundancy using an "n" number of network interfaces between each client and servers.

16. The method according to claim 14, which further comprises establishing physical interface connections between each client and server.

17. The method according to claim 16, which further comprises establishing Ethernet connections.

18. The method according to claim 14, which further comprises accessing stored video data used in a television broadcast industry.

19. The method according to claim 14, which further comprises interconnecting the data storage devices using fibre channel connections and switches.

20. The method according to claim 14, which further comprises forming the data storage devices as optical storage devices.

* * * * *